UNITED STATES PATENT OFFICE 2,297,048

LUMINESCENT COATING

Leslie Frederic Britten, Bushey Heath, Henry Grainger Jenkins, Pinner, and Alfred Hamilton McKeag, North Wembley, England, assignors to General Electric Company, a corporation of New York No Drawing. Application March 24, 1941, Serial No. 385,006. In Great Britain March 12, 1940

7 Claims. (Cl. 250—81)

This invention relates to processes and materials for coating vitreous surfaces with luminescent materials, and to electric discharge devices whose interior surfaces are so coated. This application is a continuation-in-part of our application Serial No. 339,322, filed June 7, 1940.

In one known process the powdered luminescent material is suspended in a solution of nitrocellulose, the surface to be coated is covered with the suspension and then drained; the coating left on the tube is dried and finally heated in an oxidizing atmosphere to disperse the nitrocellulose. If the surface is the interior of a tube, the suspension is best sucked into the vertical tube. Other surfaces can be coated by obvious modifications of the procedure, all being forms of the general process; thus if the exterior surface had to be coated, the same result could be obtained by plunging the tube into the suspension; but exterior coatings are much less generally used.

Manifold precautions have to be taken in order to ensure that, during the dispersal of most of the nitrocellulose, part of it is not charred, so that a dark deposit is left which reduces the efficiency of the coating. The object of this invention is to provide a substitute for nitrocellulose in the said process which is less subject to this disadvantage.

According to the invention, this substitute is an alkyl alkacrylate, preferably polymerized methyl methacrylate $(CH_2-CCH_3-COOCH_3)_n$. This material is obtainable commercially in the form of granules under the name Diakon. A similar and equally satisfactory material is sold under the name Perspex in the form of precast sheets or rods; but the granular form is generally more convenient. A suitable solvent for the material is ethyl acetate.

In place of the methyl methacrylate, we may use other polymerized products in which one or more of the methyl radicals is replaced by other alkyl radicals, such as ethyl, propyl or butyl. So far as we are aware, none of these other polymerized alkyl alkacrylates is obtainable commercially, but we have found that any of them are suitable as a substitute for methyl methacrylate in our process, so long as it is sufficiently similar to methyl methacrylate with respect to the essential property of being dispersed without charring when it is heated in air. Moreover, the resemblance is, in general, greater the less the alkyl radical differs from methyl. Thus, the material most like methyl methacrylate that we have examined is ethyl methacrylate. The temperature at which the dispersal takes place appears not to vary very rapidly with the alkyl radical.

When heated to a suitable temperature (which is less than 400° C.) in the atmosphere, the polymerized methyl methacrylate, or other alkyl alkacrylate, is dispersed, leaving no appreciable residue. An oxidizing atmosphere is not necessary; on the other hand there is apparently no advantage in using any atmosphere other than air.

If methyl methacrylate, or other alkyl alkacrylate, is the only solute in the binding solution, the dried layer of luminescent material is apt to peel off before it is baked to disperse the binder. This tendency can be greatly reduced by the addition to the solution of a suitable plasticizer, and especially camphor, without loss of the valuable features of the process. We are aware that camphor has been proposed before as a constituent of binders for luminescent materials.

One process according to the invention will now be described by way of example. 250 grams of luminescent powder, passing a sieve of 240 B. S. I. mesh, is milled for 24 hours in 250 ml. of ethyl acetate. A further 250 ml. of ethyl acetate is then added together with 200 ml. of a solution prepared by dissolving 40 parts by weight of the granules sold as Diakon D in 100 parts by weight of ethyl acetate. The liquid is shaken for about one hour and strained through silk or muslin in order to remove any aggregations of luminescent particles. 20 gm. of camphor is dissolved in the resulting suspension.

The suspension should have a viscosity of between 5 and 10 centipoises at 20° C. The viscosity is not very critical; but if it exceeds 20 centipoises, coatings will tend to be too thick and to peel on drying; if it is less than 5 centipoises, the coatings will tend to be too thin and the process may have to be repeated. The proportion of camphor is also not critical. A marked increase in peeling is likely to be produced if only 5 gm., instead of 20 gm. of camphor are used; no advantage has been found in using more than 20 gm., but there is no evidence that a little more is deleterious.

In order to coat a glass tube, say 15 mm. in diameter, with the powder, the suspension is shaken thoroughly and drawn up the tube, which is then allowed to drain and dry. The tube is inverted and the process repeated. The deposit is allowed to dry; if the tube is of a glass such as is ordinarily used for discharge lamps, the tube is then heated gradually up to 400–450° C.

over a period of 20 minutes, a slow stream of air being passed through it. The coating process is then complete. The dispersal of the methacrylate begins at temperatures much below 400° C., probably at about 200° C., the higher temperature makes the process more rapid and promotes the adhesion of the powdered material to the glass. The optimum temperature depends somewhat on the softening point of the glass.

The process, according to the invention, has been found suitable when the luminescent material is a silicate, a tungstate, phosphate, or a borate, and when it is a mixture of two or more of these compounds. (But, of course, not all possible mixtures have been tried.) There is no reason to suppose that it cannot be applied to any luminescent material obtainable in the form of powder that can be baked in air to 450° C. without harm.

We know of no reason why the polymerized methyl methacrylate used according to the invention should not be chemically similar to that sold as Diakon D. But we have made experiments to determine whether the degree of polymerization is important. For this purpose we were furnished with material whose molecular weight, determined by conventional methods, ranged from 32,000 to 138,000. So long as the viscosity of the suspension did not vary greatly, all these materials appeared to behave similarly. When an alkyl alkacrylate other than methyl methacrylate is used, the viscosity of the solution should always be adjusted according to the instructions stated hereinbefore.

What we claim as new and desire to secure by Letters Patent of the United States is:

1. The process of coating a vitreous surface with powdered luminescent material which includes the steps of coating said surface with a suspension of the luminescent material in a solution of polymerized alkyl alkacrylate and thereafter heating the coating so formed to a temperature at which said alkyl alkacrylate is dispersed.

2. The process of coating a vitreous surface with powdered luminescent material which includes the steps of coating said surface with a suspension of the luminescent material in a solution of polymerized alkyl alkacrylate in ethyl acetate and thereafter heating the coating so formed to a temperature at which said alkyl alkacrylate is dispersed.

3. The process of coating a vitreous surface with powdered luminescent material which includes the steps of coating said surface with a suspension of the luminescent material in a solution of polymerized alkyl alkacrylate and a plasticizer and thereafter heating the coating so formed to a temperature at which said plasticizer and said alkyl alkacrylate are dispersed.

4. A new material comprising a suspension of luminescent material in a solution of alkyl alkacrylate.

5. The process of coating a vitreous surface with powdered luminescent material which includes the steps of coating said surface with a suspension of the luminescent material in a solution of polymerized methyl methacrylate and thereafter heating the coating so formed to a temperature at which said methyl methacrylate is dispersed.

6. The process of coating a vitreous surface with powdered luminescent material which includes the steps of coating said surface with a suspension of the luminescent material in a solution of polymerized methyl methacrylate in ethyl acetate and thereafter heating the coating so formed to a temperature at which said methyl methacrylate is dispersed.

7. The process of coating a vitreous surface with powdered luminescent material which includes the steps of coating said surface with a suspension of the luminescent material in a solution of polymerized methyl methacrylate and a plasticizer and thereafter heating the coating so formed to a temperature at which said plasticizer and said methyl methacrylate are dispersed.

LESLIE FREDERIC BRITTEN.
HENRY GRAINGER JENKINS.
ALFRED HAMILTON McKEAG.